United States Patent [19]
Gericke et al.

[11] Patent Number: 6,128,125
[45] Date of Patent: Oct. 3, 2000

[54] DIGITAL PROJECTOR WITH AN OPTICAL SYSTEM FOR COMPENSATING THE OPTICAL PATH LENGTH DIFFERENCE

[75] Inventors: Volker Gericke, Waiblingen; Joseph-René Strobel, Winterbach; Reinhold Thiel, Leutenbach, all of Germany

[73] Assignee: Eastman Kodak Company, Rochester, N.Y.

[21] Appl. No.: 09/212,452

[22] Filed: Dec. 16, 1998

[30] Foreign Application Priority Data

Dec. 20, 1997 [DE] Germany ............................ 197 57 109

[51] Int. Cl.[7] .................................................. G02B 26/08
[52] U.S. Cl. ............................................ 359/298; 359/237
[58] Field of Search ..................................... 359/237, 238, 359/245, 259, 290, 296, 298

[56] References Cited

U.S. PATENT DOCUMENTS 5,398,081  3/1995  Jones ........................................ 359/237

FOREIGN PATENT DOCUMENTS 0 431 716 A2   6/1991   European Pat. Off. .
0 458 270 A2  11/1991   European Pat. Off. .
WO 95/33343  12/1995   WIPO .

*Primary Examiner*—Hung Xuan Dang
*Attorney, Agent, or Firm*—Roland R. Schindler, II

[57] ABSTRACT

The digital projector comprises an array of light modulators displaying the image information. An optical system is arranged downstream of the light modulators and is made up of mirrors and/or prisms, with the mirrors and/or prisms being arranged such that the light beams coming from the individual light modulators are combined in front of a projection lens. For simplification of the optical system the light modulators are arranged in checkerboard formation.

12 Claims, 3 Drawing Sheets

DIGITAL PROJECTOR WITH AN OPTICAL SYSTEM FOR COMPENSATING THE OPTICAL PATH LENGTH DIFFERENCE

FIELD OF THE INVENTION

The invention relates to a digital projector having an array of light modulators displaying image information, an optical system arranged downstream of the light modulators and a projection lens following the optical system, the optical system being made up of mirrors and prisms, with the mirrors and prisms being arranged such that the light beams coming from the individual light modulators are combined prior to entering the projection lens.

BACKGROUND OF THE INVENTION

WO 95/33343 discloses a projection system for high-definition images. A stack of three transparent LCD displays is illuminated by one light source. The light exiting from the LCD display is concentrated by means of an optical array and projected as a real image onto a screen. Since the images have an optical path length difference when split up between blue, red and green, the difference is compensated before the projection. To do so, dichroitic mirrors are provided that are arranged depending on the structure of the LCD display.

A further display for color images is disclosed in EP-0 458 270 A2. Three light modulators (red, green and blue) are linearly arranged and provided with an optical system connected in series that combines the light from the three light modulators and compensates for the optical path length difference. The optical system comprises several conventional prisms and a dichroitic mirror.

EP-0 431 716 A2 discloses a device permitting a parallax-free projection onto a CRT. The LCD's are arranged in a row. To avoid projection errors in the projection plane, a geometrical correction of the beams is performed. Each LCD is assigned a projection lens that displays on the projection screen the light that passes through the red, green or blue filters and that has been corrected by aligning lenses.

SUMMARY OF THE INVENTION

The object underlying the present invention is therefore to provide a digital projector in which the individual light modulators and the optical system necessary for projection are arranged and structured such that differences in the optical path length are compensated. In addition, the optical system is to be of simple design, inexpensive and easy to service.

This object is attained in accordance with the invention in that the light modulators are arranged in checkerboard formation.

The advantage of the digital projector is that a simple structure of the optical system is made possible by the checkerboard formation of the light modulators and can be used for compensation of the optical path length difference of the individual active light modulators. The specific arrangement of the light modulators means that the optical system manages with a minimum of optical components. Furthermore, the components of the optical system exclusively comprise mirrors or prisms and a color-combining prism. This permits a particularly inexpensive arrangement, as no complicated correction of projection errors etc. is necessary, unlike with lenses.

Further advantageous embodiments of the invention can be taken from the sub-claims.

BRIEF DESCRIPTION OF THE DRAWINGS

The subject-matter of the invention is described with reference to the embodiment shown in the drawing.

In the drawings.

DETAILED DESCRIPTION OF THE INVENTION

Figure 1:
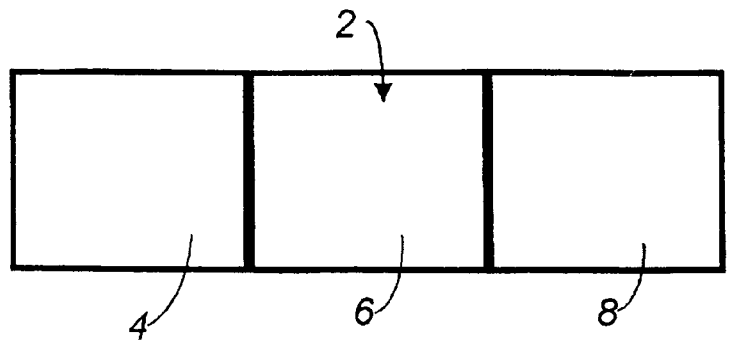
FIG. 1 shows a diagrammatic view of a linear arrangement of the light modulators in a digital projector.

As shown in FIG. 1, a digital projector (not shown) comprises several light modulators arranged in a plane 7 and in a row. In the embodiment in FIG. 1, three light modulators are arranged in a row 2. The row arrangement of the light modulators comprises a red, a blue and a green light modulator 4, 6 and 8, the sequence of which can be selected as required in the row 2. The length of the diagonal of a light modulator is 63.5 mm (2.5 inches) and the ratio of length to width is 4 to 3. Each of the light modulators is made up of a large number of pixel elements (not shown) and produced on a chip in accordance with known lithographic processes. The light coming from the pixel elements of the light modulators is emitted at a spatial angle of ±15°.

The light beams coming from the individual light modulators 4, 6 and 8 must be combined before projection without an optical path length difference. It is assumed in the following description that the row 2 of light modulators 4, 6 and 8 is laid out in a sequence of, from left to right, a red light modulator 4, a blue light modulator 6 and a green light modulator 8. It is clear for a person skilled in the art that any required sequence can be selected here and that the above embodiment can in no way be deemed as a restriction.

It is obvious from FIG. 1 that the optical path of the light coming from the red and green light modulators 4 is longer than that of the light coming from the blue light modulator 6.

Figure 2:
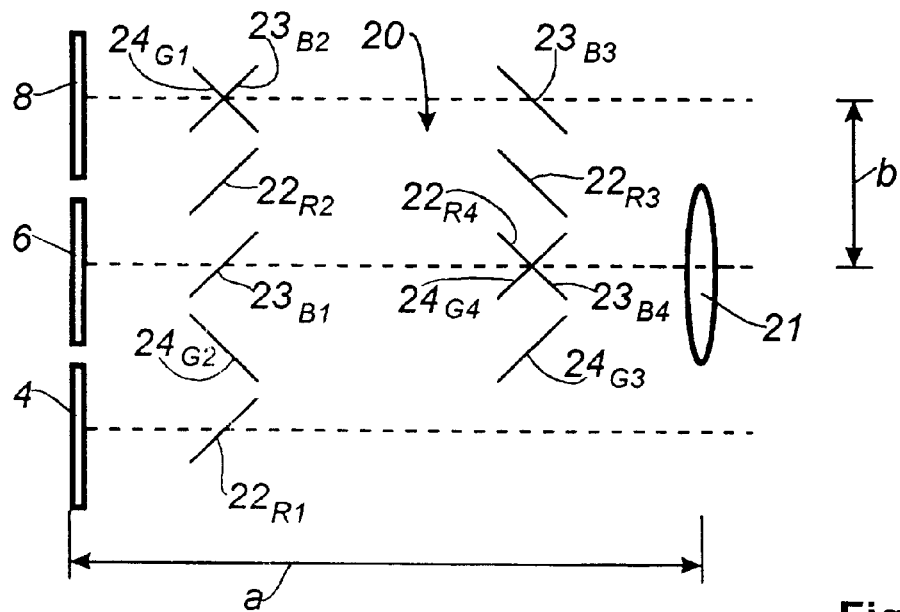
FIG. 2 shows a first embodiment of an optical system for combination of the light beams emitted by the light modulators in FIG. 1.
Figure 3:
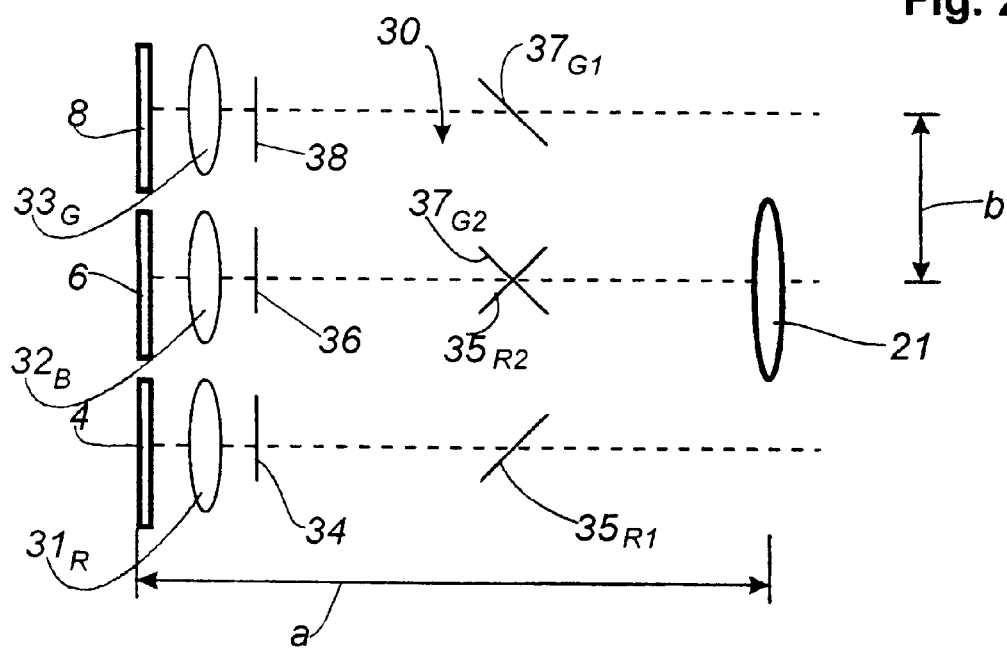
FIG. 3 shows a second embodiment of an optical system for combination of the light beams emitted by the light modulators in FIG. 1.

FIGS. 2 and 3 show two different embodiments of optical systems 20 and 30 used for combination of light beams coming from the light modulators and compensating the optical path difference. The optical system 20 shown in FIG. 2 comprises a large number of eleven mirrors and one projection lens 21. The light modulators 4, 6 and 8 have between their centers a distance b, shown in FIGS. 2 and 3 as a double-headed arrow. The row 2 of light modulators has a distance a from the projection lens 21, likewise shown as a double-headed arrow in FIGS. 2 and 3. The mirrors are arranged such that each light beam emitted by the light modulators 4, 6 and 8 covers an optical path of a +2 b.

Behind the red light modulator 4 a first mirror $22_{R1}$ is arranged at an angle of 45° in order to deflect the light coming from the red light modulator 4 parallel to row 2 of the light modulators. A further, second mirror $22_{R2}$ arranged at an angle of 45° and at a distance of 1.5 b from the first mirror $22_{R1}$ deflects the light back into the propagation direction of the light beams coming from the light modulators. Opposite the second mirror $22_{R2}$, a third mirror $22_{R3}$ is provided at an angle of −45° and deflects the light to a fourth mirror $22_{R4}$ that is arranged at a distance of 0.5 b and at an angle of −45° in front of the projection lens 21 with respect to the beam path.

Behind the blue light modulator 6 a first mirror $23_{B1}$ is arranged at an angle of 45° in order to deflect the light coming from the blue light modulator 6 parallel to row 2 of the light modulators. A further mirror $23_{B2}$ arranged at an angle of 45° and at a distance b from the first mirror $23_{B1}$ deflects the light back into the propagation direction of the light beams coming from the light modulators. Opposite the second mirror $23_{B2}$ a third mirror $23_{B3}$ is provided at an angle of −45° and deflects the light to a fourth mirror $23_{B4}$ that is identical to the fourth mirror $22_{R4}$ for reflection of the red light, and hence arranged at a distance of 1 b and at an angle of −45° in front of the projection lens 21 with respect to the beam path.

Behind the green light modulator 8 a first mirror $24_{G1}$ is arranged at an angle of −45° in order to deflect the light coming from the green light modulator 8 parallel to row 2 of the light modulators. A further mirror $24_{G2}$ arranged at an angle of −45° and at a distance of 1.5 b from the first mirror $24_{G1}$ deflects the light back into the propagation direction of the light beams coming from the light modulators. Opposite the second mirror $24_{G2}$, a third mirror $23_{B3}$ is provided at an angle of 45° and deflects the light to a fourth mirror $24_{G4}$ that is arranged at a distance of 0.5 b and at an angle of 45° in front of the projection lens 21 with respect to the beam path.

Immediately in front of the projection lens, all light beams coming from the three light modulators are combined, with each of the light beams having covered an optical distance of a +2 b.

FIG. 3 shows an optical system 30 that uses lenses and mirrors for compensation of the optical path length difference. In front of the red light modulator 4 a lens $31_R$ is provided and in front of the green light modulator 8 a lens $33_G$, both lenses $31_R$ and $33_G$ having an appropriate focal length and allowing a projection 34 and 38 of the appropriate light modulators 4 and 8 which is a one-to-one projection of the respective light modulators 4 and 8. The correction of the optical path length difference is achieved by a further lens $32_B$ arranged in front of the blue light modulator 6. The focal length of this lens $32_B$ is selected such that the optical path length differences between the red and the blue light modulators 4 and 6 and between the green and the blue light modulators 8 and 6 are compensated by the resultant projection 36.

For combination of the projections 34, 36 and 38, several mirrors are provided. Behind the projection 34 of the red light modulator 4 a first mirror $35_{R1}$ inclined at 45° is provided and deflects the light beams onto a second mirror $35_{R2}$ at an angle of 45° and arranged in front of the projection lens 21 with respect to the beam path. Behind the projection 38 of the green light modulator 8 a first mirror $37_{G1}$ inclined at an angle of −45° is provided and deflects the light beams onto a second mirror $37_{G2}$ at an angle of −45° and arranged in front of the projection lens 21 with respect to the beam path. The three projections 34, 36 and 38 are combined at the point at which the second mirrors $35_{R2}$ and $37_{G2}$ are located, and displayed without optical path length difference.

A further embodiment for projection of the three light modulators is mentioned only briefly for the sake of completeness. In this embodiment, the lenses $31_R$, $32_B$ and $33_G$ for generating the projections 34, 36 and 38 are projection lenses. The lenses in front of the red and green light modulators 4 and 8 are lenses with a fixed focal length. The projection lens in front of the blue light modulator 6 is a lens with variable focal length in order to thereby compensate for the optical path length difference. The mirror arrangement is comparable with the arrangement in FIG. 3.

Figure 4A:
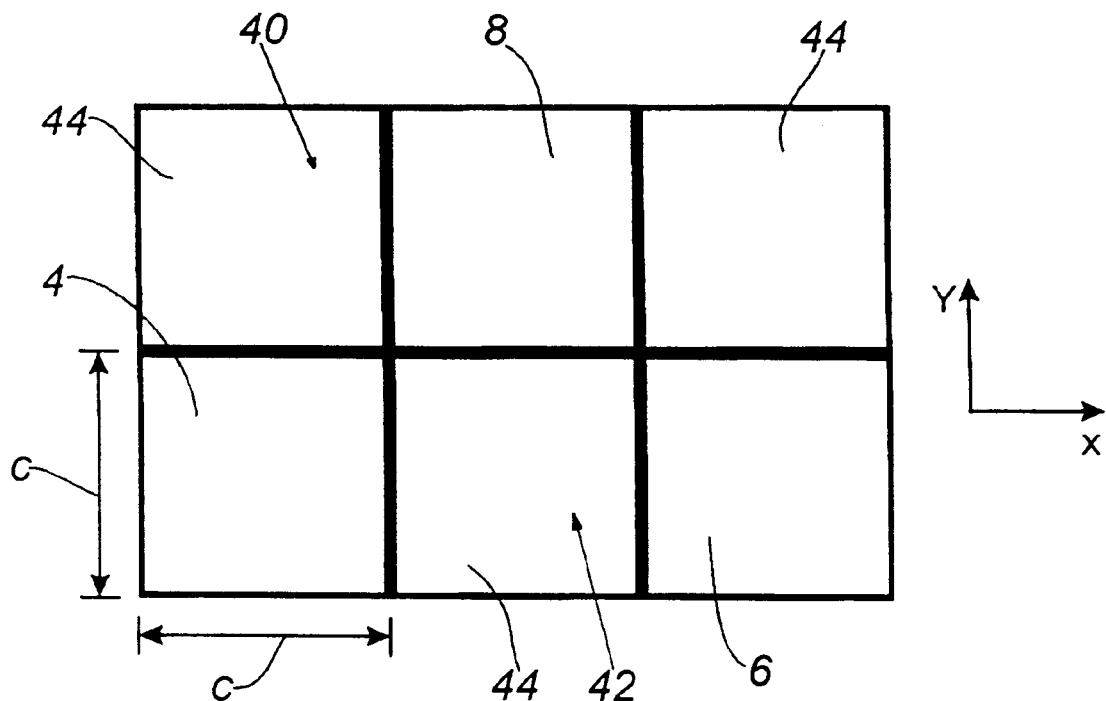
FIG. 4a shows a diagrammatic view of a checkerboard arrangement of the light modulators in a digital projector.

Another arrangement of the light modulators is shown in FIG. 4. The light modulators 4, 6 and 8 are likewise arranged in two different rows 40 and 42. The arrangement is designated as a checkerboard formation. The first row comprises one active light modulator (in the present description this is the green light modulator 8, however a different arrangement is conceivable) provided between two spacing fields 44. The second row 42 contains two active light modulators 4 and 6 both separated from one another by a spacing field 44. The active light modulators 4, 6 and 8 and the spacing fields 44 are provided on a chip. It is also possible that each light modulator is provided singly on a chip and that the three light modulators are then joined to form the arrangement as shown in FIG. 4a.

Figure 4B:
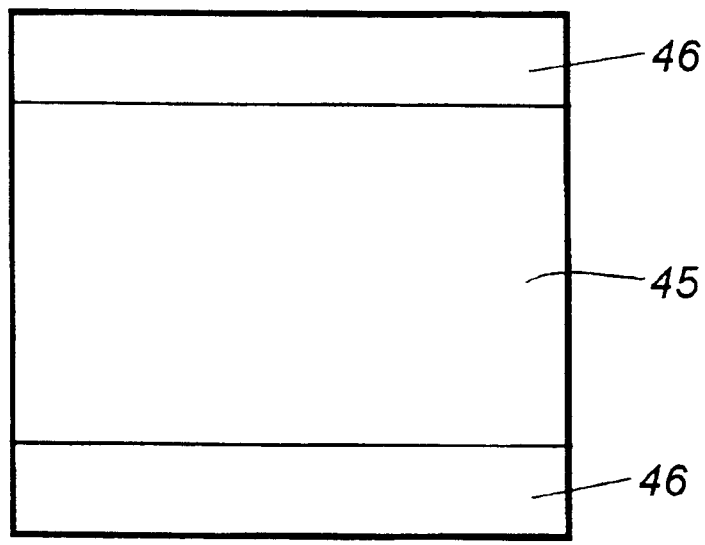
FIG. 4b shows a diagrammatic view of the light-emitting area of an active light modulator.

The active light modulators 4, 6, 8 and the spacing fields 44 are square and have a side length c (shown in FIG. 4a by a double-headed arrow). To achieve a projection with a side ratio of, for example, 4 to 3 with the active light modulators 4, 6 and 8, appropriate areas of the active light modulators 4, 6, 8 are not active. FIG. 4b shows that a light-emitting area 45 of an active light modulator 4, 6, 8 is arranged symmetrically on the surface of the active light modulator 4, 6, 8 and is bordered by the non-light-emitting areas 46 according to the side ratio. In the embodiment shown in FIG. 4b, the light-emitting area 45 is rectangular and accordingly limited at the top and bottom by non-light-emitting areas 46. Furthermore, a coordinate system is drawn in FIG. 4a that is necessary for understanding an optical system 50 as shown in FIGS. 5 and 6.

The following description relates to a specific arrangement of the light modulators 4, 6, 8 as regards color. The active light modulator 8 of the first row 40 emits the green light portion of an image to be projected. The outer-left active light modulator 4 of the second row 42 emits the red light portion, and the outer-right active light modulator 6 of the second row 42 the blue light portion of an image to be projected.

Figure 5:
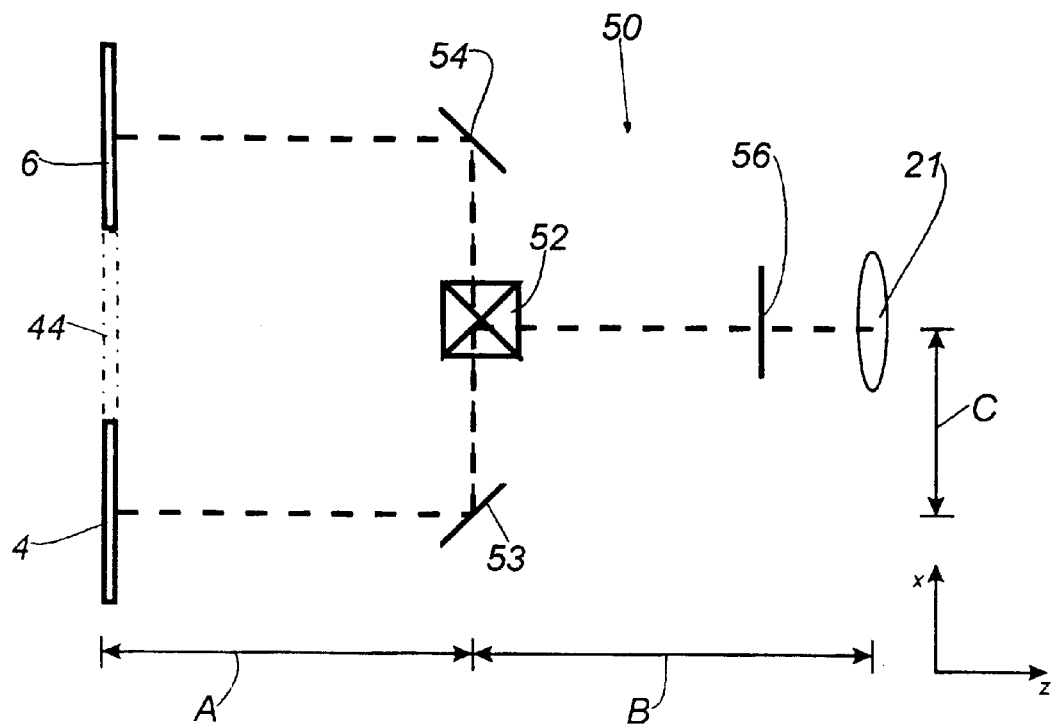
FIG. 5 shows a first part of an optical system for combining the light beams from the row with two active light modulators (see FIG. 4a)
Figure 6:
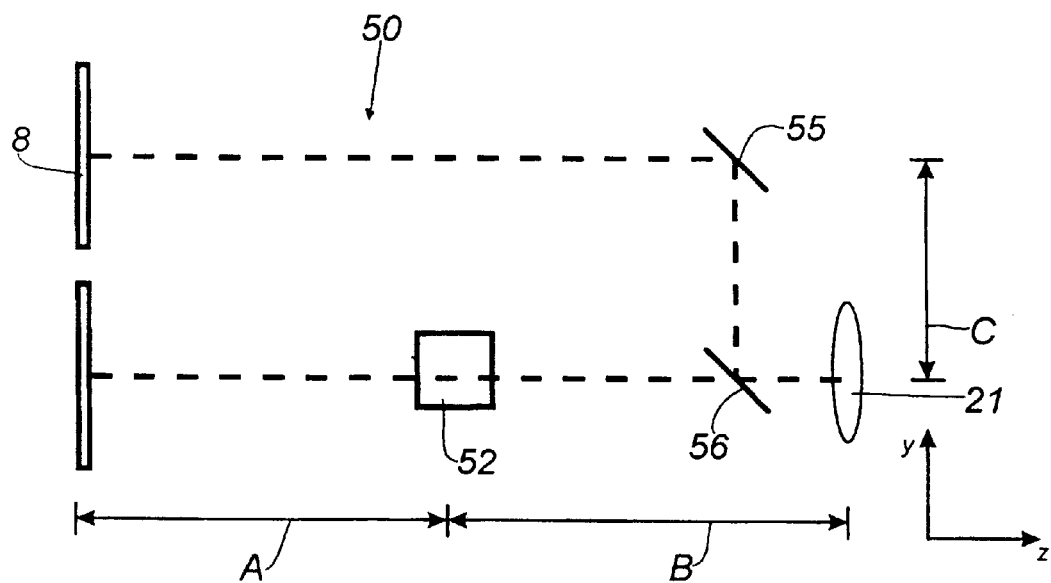
FIG. 6 shows a second part of an optical system for combining the light beams from the row with one active light modulator (see FIG. 4b) and the light beams already combined, in accordance with the optical system in FIG. 5.

FIGS. 5 and 6 show the optical system 50 for combining the light beams coming from the active light modulators 4, 6, 8. The light modulators are arranged in accordance with the pattern shown in FIG. 4a.

FIG. 5 shows that part of the optical system 50 which is used for combining the light beams coming from the red and from the blue light modulator 4 and 6. At a distance A from the plane 7 determined by the light modulators, a color-combining prism 52 and a first and a second mirror 53 and 54 are provided. The first mirror 53 is arranged centered in front of the red light modulator 4 at an angle of 45° with respect to the beam path. The second mirror 54 is arranged centered in front of the blue light modulator 6 at an angle of −45° with respect to the beam path. The red and the blue light modulators 4 and 6 are kept at a distance from one another by the spacing field 44. The color-combining prism 52 is located centered in front of the spacing field 44. The first and the second mirrors 53, 54 are attached accordingly such that they direct the light coming from the red and blue light modulators 4 and 6 onto the color-combining prism 52.

FIG. 6 now shows that part of the optical system 50 that combines the light beam coming from the green light modulator 8 with the already combined light from the red and blue light modulators 4 and 6. At a distance B from the plane fixed by the color-combining prism 52 and the first and second mirrors 53 and 54, a third mirror 55 is provided and deflects the light to a dichroitic mirror 56 also attached at a distance B behind the color-combining prism 52. The light beam from the green light modulator 8 and the already combined light beams from the red and blue light modulators 4 and 6 are combined in the beam path behind the dichroitic mirror 56. The third mirror 55 and the dichroitic mirror 56 are at a distance C from one another that is equal to the side length c of the light modulators 4, 6, 8. A projection lens 21 arranged behind the dichroitic mirror 56 projects the light beams, which have been combined without optical path length difference.

The distances of the first and second mirrors 53 and 54 and of the color-combining prism 52 can be freely selected, with two restrictions; the first restriction is that all distances must be of equal size, and the second restriction is that the distance must be selected with due consideration of the size of the optical components. The same applies for the arrangement of the third mirror 55 and of the dichroitic mirror 56.

The invention has been described in relation to a preferred embodiment, nevertheless modifications can be made within the knowledge of a person skilled in the art without departing from the scope of the claims below.

PARTS LIST 2 row of light modulators
4 red light modulator
6 blue light modulator
7 plane of light modulators
8 green light modulator
20 optical system from FIG. 2
21 projection lens
$22_{R1}$ first mirror (red)
$22_{R2}$ second mirror (red)
$22_{R3}$ third mirror (red)
$22_{R4}$ fourth mirror (red)
$23_{B1}$ first mirror (blue)
$23_{B2}$ second mirror (blue)
$23_{B3}$ third mirror (blue)
$23_{B4}$ fourth mirror (blue)
$24_{G1}$ first mirror (green)
$24_{G2}$ second mirror (green)
$24_{G3}$ third mirror (green)
$24_{G4}$ fourth mirror (green)
30 optical system from FIG. 3
$31_R$ lens in front of red light modulator
$32_B$ lens in front of blue light modulator
$33_G$ lens in front of green light modulator
34 projection behind red lens
$35_{R1}$ first mirror (red)
$35_{R2}$ second mirror (red)
36 projection behind blue lens
$37_{G1}$ first mirror (green)
$37_{G2}$ second mirror (green)
38 projection behind green lens
40 first row
42 second row
44 spacing field
45 light-emitting area
46 non-light-emitting area
50 optical system (for FIG. 4)
52 color-combining prism
53 first mirror (red)
54 second mirror (blue)
55 third mirror (green)
56 dichroitic mirror
a distance of light modulators from projection lens
b center distance of light modulators
c side length of light modulators
A distance of plane of light modulators from color-combining prism
B distance of color-combining prism from dichroitic mirror
C distance of dichroitic mirror from third mirror

What is claimed is:

1. A digital projector having an array of light modulators displaying image information by sending out a light beam, an optical system arranged downstream of the light modulators and a projection lens following the optical system, the optical system being made up of mirrors and prisms, with the mirrors and prisms being arranged such that the light beams coming from the individual light modulators are combined prior to entering projection lens, the digital projector comprising light modulators which are arranged in checkerboard formation.

2. The digital projector as claimed in claim 1, wherein the light modulators are arranged in a plane, the light modulators are arranged in a first and a second row such that at least one spacing field is placed between the light modulators such that light modulators and spacing fields alternate consecutively in the first and second row.

3. The digital projector as claimed in claim 2, wherein three fields are provided in the first row, with both of the outer fields being spacing fields which do not emit light and three fields are also provided in the second row, with the middle field being a spacing field that also does not emit light.

4. The digital projector as claimed in claim 2, wherein three fields are provided in the first row, with the middle field being a spacing field that does not emit light, and in that three fields are provided in the second row, with both of the outer fields being spacing fields which do not emit light.

5. he digital projector as claimed claim 1, wherein three conventional mirrors, one dichroitic mirror and one color-combining prism are arranged in the optical system for combining the light beams from the light modulators.

6. The digital projector as claimed in claim 5, wherein in the center in front of each of the light modulators of the second row a first and a second mirror are arranged respectively at a distance, in that the light from each of the two light modulators is directed onto a color-combining prism arranged between the first and second mirrors and having an identical distance from each of the mirrors.

7. The digital projector as claimed in claim 6, wherein the first and second mirrors and the color-combining prism each are positioned at an identical distance from the plane formed by the light modulators.

8. The digital projector as claimed in claim 6, wherein the distance is equal to a side length of the light modulator.

9. The digital projector as claimed in claim 5, wherein the center in front of the light modulator of the first row with one active light modulator a third mirror is provided and arranged at a distance behind the color-combining prism, in that a dichroitic mirror is provided at the same distance as the third mirror and combines the combined light beam coming from the color-combining prism with the light coming from the third mirror and directs it to the projection lens, and in that the third mirror has a distance from the dichroitic mirror.

10. The digital projector as claimed in claim 9, characterized in that the distance is equal to the side length of the light modulators.

11. A digital projector having an array of light modulators displaying image information by sending out a light beam, an optical system arranged downstream of the light modulators and a projection lens following the optical system, the optical system being made up of mirrors, with the mirrors being arranged such that the light beams coming from the individual light modulators are combined in front of a prior to entering projection lens, the digital projector comprising light modulators which are arranged in checkerboard formation.

12. A digital projector having an array of light modulators displaying image information by sending out a light beam, an optical system arranged downstream of the light modulators and a projection lens following the optical system, the optical system being made up of prisms, with the prisms being arranged such that the light beams coming from the individual light modulators are combined prior to entering projection lens, the digital projector comprising light modulators which are arranged in checkerboard formation.

* * * * *